United States Patent
Fukuda et al.

(10) Patent No.: US 11,306,194 B2
(45) Date of Patent: *Apr. 19, 2022

(54) NUCLEATING AGENT, POLYOLEFIN-BASED RESIN COMPOSITION CONTAINING SAME, AND MOLDED ARTICLE THEREOF

(71) Applicant: ADEKA CORPORATION, Tokyo (JP)

(72) Inventors: Takuya Fukuda, Saitama (JP); Hiroaki Mizushima, Saitama (JP); Yuri Yokota, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/969,404

(22) PCT Filed: Feb. 4, 2019

(86) PCT No.: PCT/JP2019/003907
§ 371 (c)(1),
(2) Date: Aug. 12, 2020

(87) PCT Pub. No.: WO2019/159743
PCT Pub. Date: Aug. 22, 2019

(65) Prior Publication Data
US 2021/0047498 A1 Feb. 18, 2021

(30) Foreign Application Priority Data

Feb. 13, 2018 (CN) .......................... 201810150606.1

(51) Int. Cl.
*C08K 5/527* (2006.01)
*C08L 23/12* (2006.01)
*C08K 5/00* (2006.01)

(52) U.S. Cl.
CPC ............ *C08K 5/0083* (2013.01); *C08K 5/527* (2013.01); *C08L 23/12* (2013.01); *C08L 2205/24* (2013.01)

(58) Field of Classification Search
CPC ........................... C07F 9/65744; C08K 5/527
See application file for complete search history.

(56) References Cited

U.S. PATENT DOCUMENTS

| | | | |
|---|---|---|---|
| 4,463,113 A | 7/1984 | Nakahara et al. | |
| 5,049,605 A | 9/1991 | Rekers | |
| 6,818,690 B1 | 11/2004 | Kobayashi et al. | |
| 7,405,252 B2* | 7/2008 | Ishizuka | C08K 5/521 |
| | | | 524/417 |
| 2003/0236329 A1 | 12/2003 | Kawamoto et al. | |
| 2004/0096661 A1 | 5/2004 | Royer et al. | |
| 2014/0005310 A1 | 1/2014 | Gerster et al. | |
| 2019/0062527 A1 | 2/2019 | Mizushima et al. | |
| 2019/0284217 A1* | 9/2019 | Mizushima | C07F 9/6574 |
| 2020/0207950 A1* | 7/2020 | Fukuda | C08K 5/527 |

FOREIGN PATENT DOCUMENTS

| | | |
|---|---|---|
| CA | 2030179 A1 | 6/1991 |
| CN | 101704847 A | 5/2010 |
| CN | 102382139 A | 3/2012 |
| CN | 102766164 A | 11/2012 |
| CN | 105131334 A | 12/2015 |
| EP | 0 432 505 A2 | 6/1991 |
| JP | 58-1736 A | 1/1983 |
| JP | 59-184252 A | 10/1984 |
| JP | 3-81368 A | 4/1991 |
| JP | 5-339447 A | 12/1993 |
| JP | 6-340786 A | 12/1994 |
| JP | 7-11075 A | 1/1995 |
| JP | 7-48473 A | 2/1995 |
| JP | 8-3364 A | 1/1996 |
| JP | 9-118776 A | 5/1997 |
| JP | 10-25295 A | 1/1998 |

(Continued)

OTHER PUBLICATIONS

International Search Report issued in PCT/JP2019/003907 (PCT/ISA/210), dated Apr. 23, 2019.

(Continued)

*Primary Examiner* — Vickey Nerangis
(74) *Attorney, Agent, or Firm* — Birch, Stewart, Kolasch & Birch, LLP

(57) ABSTRACT

Provided are: a nucleating agent capable of simultaneously improving the thermal stability and the transparency of a polyolefin resin; a polyolefin-based resin composition containing the same; and a molded article of the composition. The nucleating agent contains a compound represented by Formula (1) below where $R^1$ to $R^4$ each independently represent a hydrogen atom or a linear or branched alkyl group having 1 to 9 carbon atoms; $R^5$ represents an alkanediyl group having 1 to 4 carbon atoms; and M represents a hydrogen atom or a sodium atom. In this nucleating agent, the mass ratio of phosphorus atoms and sodium atoms, P/Na, is in a range of 1.200 to 1.500.

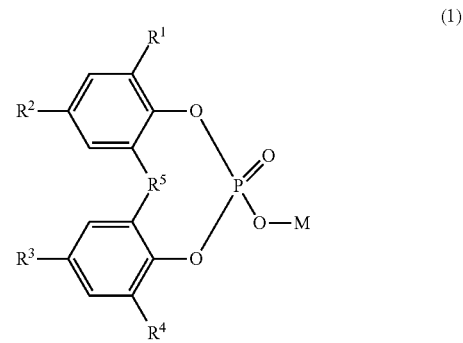

(1)

4 Claims, No Drawings

(56) References Cited

FOREIGN PATENT DOCUMENTS

| JP | 2000-281735 A | 10/2000 |
| JP | 2002-338820 A | 11/2002 |
| JP | 2003-335968 A | 11/2003 |
| JP | 2006-307038 A | 11/2006 |
| SU | 527459 | 9/1976 |
| WO | WO 2017/150662 A1 | 9/2017 |

OTHER PUBLICATIONS

Written Opinion of the International Searching Authority issued in PCT/JP2019/003907 (PCT/ISA/237), dated Apr. 23, 2019.
Database WPI Week 201327 Thomson Scientific, London, GB; AN 2013-B96618 XP002802140 & CN 102 766 164 A (Nov. 7, 2012).
Extended European Search Report dated Mar. 9, 2021, in European Patent Application No. 19753689.9.
Huang et al., "Synthesis, Characterization and Application of 2,2'-methylene-bis(4,6-di-tert-butyl-phenyl) Phosphate Sodium," Research in Materials and Manufacturing Technologies: Selected Peer Reviewed Papers from the 3rd International Conference on Materials and Products Manufacturing Technology (ICMPMT 2013), Sep. 25-26, 2013, Guangzhou, China.
Zhang et al., "Nucleating Efficiency of Organic Phosphates in Polypropylene," Journal of Macromolecular Science, Part B (2003), vol. 42, No. 3-4, pp. 467-478.
Zhang, Y.-f. and X. Zhong, "Effects of Substituted Aromatic Heterocyclic Phosphate Salts on Properties, Crystallization, and Melting Behaviors of Isotactic Polypropylene," Journal of Applied Polymer Science (2006), vol. 100, pp. 4868-4874.
Office Action dated Dec. 4, 2020, in Chinese Patent Application No. 201980013019.0.
Office Action dated Nov. 24, 2020, in Russian Patent Application No. 2020129895.
Russian Office Action for Russian Application No. 2020129895, dated Apr. 7, 2021, with English translation.

\* cited by examiner

NUCLEATING AGENT, POLYOLEFIN-BASED RESIN COMPOSITION CONTAINING SAME, AND MOLDED ARTICLE THEREOF

TECHNICAL FIELD

The present invention relates to a nucleating agent, a polyolefin-based resin composition containing the same, and a molded article of the composition. More particularly, the present invention relates to: a nucleating agent capable of simultaneously improving the thermal stability and the transparency of a polyolefin resin; a polyolefin-based resin composition containing the same; and a molded article of the composition.

BACKGROUND ART

Olefin resins, such as polyethylene, polypropylene and polybutene-1, advantageously have excellent moldability, heat resistance, mechanical characteristics, low specific gravity and the like; therefore, they are widely utilized in films, sheets, and various molded articles (e.g., structural components). However, olefin-based resins have problems of, for example, requiring a long molding cycle in processing due to slow crystallization after being heat-molded, and there are cases where their molded articles are deformed due to crystallization that progresses even after molding. Moreover, since olefin resins generate large crystals when heat-molded, there are such drawbacks that the resulting molded articles have insufficient strength and poor transparency.

It is known that these drawbacks are attributed to the crystallinity of olefin resins and can be overcome by allowing each olefin resin to rapidly generate fine crystals. In order to achieve rapid generation of fine crystals, a method of adding a nucleating agent, a crystallization accelerator and/or the like is employed.

As such nucleating agents, conventionally, for example, metal carboxylates, such as sodium benzoate, 4-tert-butyl-benzoate aluminum salt, sodium adipate, and disodium bicyclo[2.2.1]heptane-2,3-dicarboxylate; metal phosphates, such as sodium bis(4-tert-butylphenyl) phosphate, sodium 2,2'-methylene-bis(4,6-di-tert-butylphenyl) phosphate, and lithium 2,2'-methylene-bis(4,6-di-tert-butylphenyl) phosphate; and compounds having an acetal skeleton, such as dibenzylidene sorbitol, bis(methylbenzylidene)sorbitol and bis(dimethylbenzylidene)sorbitol, are used as disclosed in, for example, Patent Documents 1 to 8.

RELATED ART DOCUMENTS

Patent Documents

[Patent Document 1] JPS58-1736A
[Patent Document 2] JPS59-184252A
[Patent Document 3] JPH06-340786
[Patent Document 4] JPH07-11075A
[Patent Document 5] JPH07-48473A
[Patent Document 6] JPH08-3364A
[Patent Document 7] JPH09-118776A
[Patent Document 8] JPH10-25295A

SUMMARY OF THE INVENTION

Problems to be Solved by the Invention

Among these nucleating agents, sodium 2,2'-methylene-bis(4,6-di-tert-butylphenyl) phosphate not only markedly improves the rigidity, the thermal deformation temperature and the crystallization temperature of polyolefin resins, but also exhibits excellent effects of improving the heat resistance and the transparency. However, even sodium 2,2'-methylene-bis(4,6-di-tert-butylphenyl) phosphate does not necessarily improve the heat resistance and the transparency of a polyolefin resin. In other words, even sodium 2,2'-methylene-bis(4,6-di-tert-butylphenyl) phosphate is inconsistent in its effect of improving the heat resistance and the transparency of a polyolefin resin and has problems of, for example, not being able to simultaneously improve these properties; therefore, an improvement is desired at present.

In view of the above, an object of the present invention is to provide: a nucleating agent which can solve the above-described problems and improve simultaneously the thermal stability and the transparency of a polyolefin resin; a polyolefin-based resin composition containing the same; and a molded article of the composition.

Means for Solving the Problems

The present inventors intensively studied to solve the above-described problems and consequently found that the above-described problems occur even with the use of a nucleating agent containing sodium 2,2'-methylene-bis(4,6-di-tert-butylphenyl) phosphate when the ratio P/Na is outside a specific range in its relationship with other components that are impurities. Based on this finding, the present inventors further intensively studied to discover that the above-described problems can be solved by adopting the below-described constitution, thereby completing the present invention.

That is, the nucleating agent of the present invention is a nucleating agent containing a compound represented by the following Formula (1):

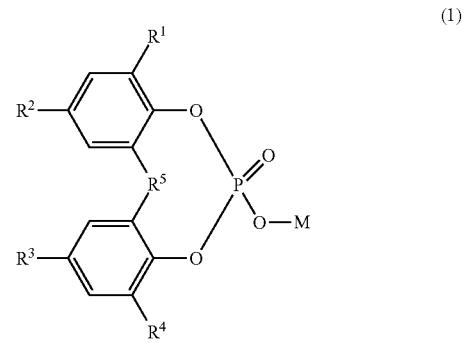

where $R^1$ to $R^4$ each independently represent a hydrogen atom or a linear or branched alkyl group having 1 to 9 carbon atoms; $R^5$ represents an alkanediyl group having 1 to 4 carbon atoms; and M represents a hydrogen atom or a sodium atom, the nucleating agent being characterized in that a mass ratio of phosphorus atoms and sodium atoms therein, P/Na, is in a range of 1.200 to 1.500.

In the nucleating agent of the present invention, the mass ratio of phosphorus atoms and sodium atoms, P/Na, is preferably in a range of 1.350 to 1.450.

A polyolefin-based resin composition of the present invention is characterized by containing the nucleating agent of the present invention in an amount of 0.001 to 10 parts by mass with respect to 100 parts by mass of a polyolefin-based resin.

A molded article of the present invention is characterized in that it is obtained by molding the polyolefin-based resin composition of the present invention.

EFFECTS OF THE INVENTION

According to the present invention, a nucleating agent capable of simultaneously improving the thermal stability and the transparency of a polyolefin resin, a polyolefin-based resin composition containing the same, and a molded article of the composition can be provided.

Mode for Carrying Out the Invention

The nucleating agent of the present invention, the polyolefin-based resin composition containing the same, and the molded article of the composition will now be described in detail.

The nucleating agent of the present invention is a nucleating agent containing a compound represented by the following Formula (1):

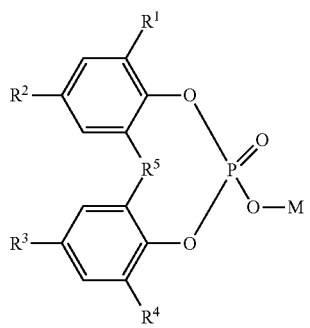

(1)

where $R^1$ to $R^4$ each independently represent a hydrogen atom or a linear or branched alkyl group having 1 to 9 carbon atoms, $R^5$ represents an alkanediyl group having 1 to 4 carbon atoms, and M represents a hydrogen atom or a sodium atom.

Examples of the alkyl group having 1 to 9 carbon atoms that is represented by $R^1$, $R^2$, $R^3$ and $R^4$ in Formula (1) include a methyl group, an ethyl group, a propyl group, an isopropyl group, a butyl group, a sec-butyl group, a tert-butyl group, an isobutyl group, an amyl group, an isoamyl group, a tert-amyl group, a hexyl group, a cyclohexyl group, a heptyl group, an isoheptyl group, and a tert-heptyl group, among which a tert-butyl group is particularly preferred.

Examples of the alkanediyl group having 1 to 4 carbon atoms that is represented by $R^5$ in Formula (1) include methylene, ethylene, propane-1,3-diyl, propane-1,2-diyl, butane-1,4-diyl, and butane-1,3-diyl. The alkanediyl group is preferably methylene.

In the nucleating agent of the present invention, the mass ratio of phosphorus atoms and sodium atoms, P/Na, is in a range of 1.200 to 1.500. By controlling this ratio P/Na in this range, the nucleating agent can simultaneously improve the thermal stability and the transparency. When the ratio P/Na is lower than 1.200, the nucleating agent contains a large amount of sodium salt other than the compound represented by Formula (1), and this makes the nucleating agent alkaline, as a result of which yellowing caused by a phenolic antioxidant occurs in a composition and a molded article thereof. Meanwhile, when the ratio P/Na is higher than 1.500, the proportion of a compound wherein M is a hydrogen atom is high in compounds represented by Formula (1) that are contained in the nucleating agent, as a result of which sufficient transparentization performance and sufficient thermal stability cannot be ensured. The ratio P/Na is preferably 1.350 to 1.450.

A method of producing the compound represented by Formula (1) according to the nucleating agent of the present invention is not particularly restricted, and a compound represented by Formula (1) according to the nucleating agent of the present invention wherein M is a sodium atom can be obtained by, for example, allowing phosphorus trichloride (or phosphorus oxychloride) and 2,2'-alkylidenebisphenol to react with each other, subsequently hydrolyzing the resultant as required to obtain a cyclic acidic phosphate, allowing the thus obtained cyclic acidic phosphate to react with sodium hydroxide, and then filtering and drying the resulting compound.

When a compound represented by Formula (1) according to the nucleating agent of the present invention wherein M is a sodium atom is synthesized by the above-described method, the theoretical value of P/Na is 1.347. However, usually, when a compound represented by Formula (1) wherein M is a sodium atom is synthesized by this production method, a compound wherein M is a hydrogen atom remains as an impurity in a case where neutralization is imperfect, or excess sodium hydroxide remains in a case where neutralization is excessive. This causes the ratio P/Na to be outside the above-described range, making the nucleating agent unable to impart sufficient heat resistance and transparency to a polyolefin resin composition. Therefore, by controlling the ratio P/Na to be in the above-described range using a known purification means or the like, excellent heat resistance and transparency can be imparted to a polyolefin-based resin.

The nucleating agent of the present invention may be produced by, as described above, allowing a cyclic acidic phosphoric acid ester to react with sodium hydroxide and adjusting the ratio P/Na to be in the above-described range using a known purification means or the like in the process of producing a compound represented by Formula (1) wherein M is a sodium atom, or by mixing a compound of Formula (1) wherein M is a sodium atom, which is obtained by the above-described procedure, with a compound of Formula (1) wherein M is a hydrogen atom such that the above-described ratio is attained; however, the method of producing the nucleating agent is not necessarily restricted thereto.

The nucleating agent of the present invention may consist of only a compound represented by Formula (1) or may contain a known additive(s) in addition to a compound represented by Formula (1). The content of the compound represented by Formula (1) is preferably 1 to 100% by mass, more preferably 10 to 100% by mass.

Next, the polyolefin-based resin composition of the present invention will be described.

The polyolefin-based resin composition of the present invention contains the nucleating agent of the present invention in an amount of 0.001 to 10 parts by mass with respect to 100 parts by mass of a polyolefin-based resin. When this amount is less than 0.001 parts by mass, the effects of the nucleating agent are not sufficiently exerted, whereas when the amount is greater than 10 parts by mass, the nucleating agent may bleed out on the surface of a molded article obtained by molding the polyolefin-based resin composition. The nucleating agent is incorporated in an amount of preferably 0.005 to 8 parts by mass, more preferably 0.01 to 5 parts by mass.

Examples of the polyolefin-based resin used in the polyolefin-based resin composition of the present invention include α-olefin polymers, such as low-density polyethylenes, linear low-density polyethylenes, high-density polyethylenes, isotactic polypropylenes, syndiotactic polypropylenes, hemi-isotactic polypropylenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers. Among these polyolefin-based resins, polypropylene-based resins for which the nucleating agent of the present invention exhibits a prominent effect of use are preferred and, for example, polypropylenes, ethylene-propylene block or random copolymers, block or random copolymers of an α-olefin other than ethylene and propylene, and mixtures of any of these propylene-based polymers and other α-olefin polymer can be used as well.

Further, among these polyolefin-based resins, ones having a melt flow rate in a range of 1 to 100 g/10 min can be preferably used since the effects of the present invention are thereby obtained in a favorable manner, and those polyolefin-based resins having a melt flow rate in a range of 2 to 60 g/10 min are particularly preferred.

As for a method of producing the polyolefin-based resin, in a variety of polymerization methods such as vapor-phase polymerization, solution polymerization, emulsion polymerization and bulk polymerization that include the use of various polymerization catalysts (e.g., Ziegler catalysts, Ziegler-Natta catalysts, and metallocene catalysts), co-catalysts, catalyst carriers and chain transfer agents, the polyolefin-based resin can be produced by appropriately selecting the polymerization conditions (e.g., temperature, pressure, concentration, flow rate, and removal of catalyst residue) that yield a resin having physical properties suitable for a packaging material or a resin having physical properties suitable for molding of a packaging material. Other properties of the polyolefin-based resin, such as number-average molecular weight, weight-average molecular weight, molecular weight distribution, melt flow rate, melting point, melting peak temperature, stereoregularity (e.g., isotacticity or syndiotacticity), presence/absence and degree of branching, specific gravity, ratio of a component(s) dissolving in various solvents, haze, gloss, impact strength, bending elastic modulus and Olsen rigidity, as well as whether or not the respective property values satisfy a specific formula, can be selected as appropriate in accordance with the desired properties.

In the polyolefin-based resin composition of the present invention, as required, conventionally known other additives that are generally used may be incorporated within a range that does not impair the effects of the present invention. These other additives may be added to the nucleating agent of the present invention to prepare an additive composition, and this composition may then be added to a polyolefin-based resin.

Examples of such other additives that can be used include: plasticizers, such as neopentyl glycol derivatives, polyalkylene glycols and derivatives thereof, and epoxy compounds of polyhydric alcohols and derivatives thereof; antioxidants, such as phenolic, phosphorus-based, and sulfur-based antioxidants; light stabilizers, such as hindered amine-based light stabilizers and ultraviolet absorbers; lubricants, such as hydrocarbon compounds, fatty acid compounds, aliphatic alcohol compounds, aliphatic ester compounds, aliphatic amide compounds, aliphatic carboxylic acid metal salt compounds, and other metallic soaps; heavy metal deactivators; antistatic agents, such as cationic surfactants, anionic surfactants, nonionic surfactants, and amphoteric surfactants; halogen compounds; phosphoric acid ester compounds; phosphoric acid amide compounds; melamine compounds; fluorocarbon resins or metal oxides; flame retardants, such as melamine (poly)phosphate and piperazine (poly)phosphate; fillers, such as glass fibers and calcium carbonate; silicate-based inorganic additives, such as hydrotalcite, fumed silica, fine particle silica, silica rock, diatomites, clay, kaolin, diatomaceous earth, silica gel, calcium silicate, sericite, kaolinite, flint, feldspar powder, vermiculite, attapulgite, talc, mica, minnesotaite, pyrophyllite, and silica; nucleating agents other than the one used in the polyolefin-based resin composition of the present invention; colorants; pigments; anti-fogging agents; various fillers; mold release agents; fragrants; foaming agents; antibacterial agents; and antifungal agents. Particularly, a phenolic or phosphorus-based antioxidant is preferably used since it also exhibits an effect as an anti-coloring agent of a polyolefin-based resin composition.

Examples of the phenolic antioxidants include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis[methylene-3-(3',5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, and triethylene glycol-bis[β-(3-tert-butyl-4-hydroxy-5-methylphenyl)propionate]. The amount of a phenolic antioxidant to be used is preferably 0.001 to 10 parts by mass, more preferably 0.01 to 5 parts by mass, with respect to 100 parts by mass of the polyolefin-based resin.

Examples of the phosphorus-based antioxidants include triphenyl phosphite, tris(2,4-di-tert-butylphenyl)phosphite, tris(2,5-di-tert-butylphenyl)phosphite, tris(nonylphenyl) phosphite, tris(dinonylphenyl)phosphite, tris(mono- or di-mixed nonylphenyl)phosphite, diphenyl acid phosphite, 2,2'-methylene-bis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol)-1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra(C12-15 mixed alkyl)-4,4'-isopropylidene diphenyl phosphite, bis[2,2'-methylene-bis(4,6-diamylphenyl)]-isopropylidene diphenyl phosphite, tetratridecyl-4,4'-butylidenebis(2-tert-butyl-5-methylphenol)diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, and 2-butyl-2-ethylpropanediol-2,4,6-tri-tert-butylphenol monophosphite. The amount of a phosphorus-based antioxidant to be used is preferably 0.001 to 10 parts by mass, more preferably 0.01 to 5 parts by mass, with respect to 100 parts by mass of the polyolefin-based resin.

Examples of the sulfur-based antioxidants include: dialkyl thiodipropionates, such as dilauryl thiodipropionate, dimyristyl thiodipropionate, myristylstearyl thiodipropionate, and distearyl thiodipropionate; and β-alkylmercaptopropionates of polyols, such as pentaerythritol-tetra(β-dodecylmercaptopropionate). The amount of a sulfur-based antioxidant to be used is preferably 0.001 to 10 parts by mass, more preferably 0.01 to 5 parts by mass, with respect to 100 parts by mass of the polyolefin-based resin.

Examples of the hindered amine-based light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazin e polycondensate, 1,5,8,12-tetrakis[2,4-bis(N-butyl-N-(2,2,6, 6-tetramethyl-4-piperidyl)amino)-s-triazine-6-yl]-1,5,8,12-tetraazadodecane, 1,5,8,12-tetrakis[2,4-bis(N-butyl-N-(1,2, 2,6,6-pentamethyl-4-piperidyl)amino)-s-triazine-6-yl]-1,5, 8,12-tetraazadodecane, 1,6,11-tris[2,4-bis(N-butyl-N-(2,2,6, 6-tetramethyl-4-piperidyl)amino)-s-triazine-6-yl]aminoun decane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl) piperidyl}decanedionate, bis{4-(2,2,6,6-tetramethyl-1-undecyloxy)piperidyl)carbonate, and TINUVIN NOR 371 manufactured by Ciba Specialty Chemicals K.K. The amount of a hindered amine-based light stabilizer to be used is preferably 0.001 to 5 parts by mass, more preferably 0.005 to 0.5 parts by mass, with respect to 100 parts by mass of the polyolefin-based resin Examples of the ultraviolet absorbers include 2-hydroxybenzophenones, such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2-hydroxyphenyl) benzotriazoles, such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates, such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy) benzoate, hexadecyl(3,5-di-tert-butyl-4-hydroxy)benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'- dodecyloxanilide; cyanoacrylates, such as ethyl-α-cyano-β,β-diphenylacrylate and methyl-2-cyano-3-methyl-3-(p-methoxyphenyl)acrylate; and a variety of metal salts and metal chelates, particularly salts and chelates of nickel and chromium. The amount of an ultraviolet absorber to be used preferably 0.001 to 10 parts by mass, more preferably 0.01 to 5 parts by mass, with respect to 100 parts by mass of the polyolefin-based resin.

Examples of the aliphatic amide compounds used as lubricants include mono-fatty acid amides, such as lauric acid amide, stearic acid amide, oleic acid amide, erucic acid amide, ricinoleic acid amide, and 12-hydroxystearic acid amide; N,N'-bis-fatty acid amides, such as N,N'-ethylene-bis-lauric acid amide, N,N'-methylene-bis-stearic acid amide, N,N'-ethylene-bis-stearic acid amide, N,N'-ethylene-bis-oleic acid amide, N,N'-ethylene-bis-behenic acid amide, N,N'-ethylene-bis-12-hydroxystearic acid amide, N,N'-butylene-bis-stearic acid amide, N,N'-hexamethylene-bis-stearic acid amide, N,N'-hexamethylene-bis-oleic acid amide, and N,N'-xylylene-bis-stearic acid amide; alkylol amides, such as stearic acid monomethylol amide, coconut oil fatty acid monoethanol amide, and stearic acid diethanol amide; N-substituted fatty acid amides, such as N-oleyl stearic acid amide, N-oleyl oleic acid amide, N-stearyl stearic acid amide, N-stearyl oleic acid amide, N-oleyl palmitic acid amide, and N-stearyl erucic acid amide; and N,N'-substituted dicarboxylic acid amides, such as N,N'-dioleyl adipic acid amide, N,N'-distearyl adipic acid amide, N,N'-dioleyl sebacic acid amide, N,N'-distearyl sebacic acid amide, N,N'-distearyl terephthalic acid amide, and N,N'-distearyl isophthalic acid amide. These lubricants may be used individually, or two or more thereof may be used in the form of a mixture. The amount of the lubricant(s) to be used is preferably 0.01 to 30 parts by mass, more preferably 0.1 to 20 parts by mass, with respect to 100 parts by mass of the polyolefin-based resin.

Examples of other nucleating agents include metal carboxylates, such as sodium benzoate, 4-tert-butylbenzoate aluminum salt, sodium adipate, and disodium bicyclo[2.2.1]heptane-2,3-dicarboxylate; metal phosphates, such as sodium bis(4-tert-butylphenyl) phosphate, hydroxyaluminum bis[2,2'-methylene-bis(4,6-di-tert-butylphenyl) phosphate], and lithium 2,2'-methylene-bis(4,6-di-tert-butylphenyl) phosphate; polyhydric alcohol derivatives, such as dibenzylidene sorbitol, bis(methylbenzylidene)sorbitol, bis(p-ethylbenzylidene)sorbitol, and bis(dimethylbenzylidene) sorbitol; and amide compounds, such as N,N',N"-tris[2-methylcyclohexyl]-1,2,3-propanetricarboxamide (RIKACLEAR PC1), N,N',N"-tricyclohexyl-1,3,5-benzenetricarboxamide, N,N'-dicyclohexyl-naphthalenedicarboxamide, and 1,3,5-tri(dimethylisopropoylamino)benzene. The amount of the above-described other nucleating agent(s) to be used is preferably 0.001 to 10 parts by mass, more preferably 0.005 to 5 parts by mass, with respect to 100 parts by mass of the polyolefin-based resin.

In the polyolefin-based resin composition of the present invention, a method of blending the nucleating agent of the present invention into the polyolefin-based resin is not particularly restricted, and any conventionally known method can be employed. For example, the polyolefin-based resin in a powder or pellet form may be mixed with the nucleating agent of the present invention by dry blending, or the nucleating agent of the present invention may be partially pre-blended and then dry-blended along with remaining components. After the dry blending, for example, the resultant may be mixed using a mill roll, a Banbury mixer, a super mixer or the like, and kneaded using a uniaxial or biaxial extruder or the like. The mixing and kneading are usually performed at a temperature of about 120 to 250° C. For example, a method in which the nucleating agent of the present invention is added in the stage of polymerizing the polyolefin-based resin; a method in which, after mixing the nucleating agent of the present invention in advance with, for example, a granulation aid such as a binder, a wax, a solvent, or silica at a desired ratio, the resulting mixture is granulated to prepare a one-pack composite additive and this one-pack composite additive is added to the polyolefin-based resin; or a method in which a masterbatch containing the nucleating agent of the present invention at a high concentration is prepared and then added to the polyolefin-based resin, can be employed.

The molded article of the present invention is obtained by molding the polyolefin-based resin composition of the present invention. The polyolefin-based resin composition of the present invention can be molded in the same manner as general plastics by, for example, extrusion molding, injection molding, blow molding, vacuum molding, rotational molding, inflation molding, calender molding, slush molding, dip molding, or foam molding, and among these molding methods, injection molding, extrusion molding or blow molding is preferred. Examples of the molded article of the present invention include injection-molded articles, fibers, flat yarns, biaxially stretched films, uniaxially stretched films, unstretched films, sheets, thermoformed articles, extrusion blow-molded articles, injection blow-molded articles, injection stretch blow-molded articles, profile extrusion-molded articles, and rotationally molded articles. Thereamong, the molded article of the present invention is preferably an injection-molded article, a film, a sheet, or a thermoformed article.

The polyolefin-based resin composition of the present invention can be used in various applications, such as building materials, agricultural materials, components for vehicles (e.g., automobiles, trains, ships, and airplanes), packaging materials, miscellaneous goods, toys, home electric appliances, and medical supplies. Specific examples of these applications include automobile components, such as bumpers, dashboards, instrument panels, battery casings, luggage cases, door panels, door trims, and fender liners; resin components for home electric appliances, such as refrigerators, laundry machines, and vacuum cleaners; household articles, such as tableware, buckets, and bath goods; resin components for connection, such as connectors; miscellaneous goods, such as toys, storage containers, and synthetic paper; medical molded articles, such as medical packages, syringes, catheters, medical tubes, syringe preparations, infusion solution bags, reagent containers, medicine containers, and medicine individual packagings; building materials, such as wall materials, flooring materials, window frames, wall papers, windows; wire coating materials; agricultural materials, such as greenhouses tunnels, and flat yarn mesh bags; industrial materials, such as pallets, pail cans, backgrind tapes, tapes for liquid crystal protection, pipes, and modified silicone polymers for sealing materials; food packaging materials, such as wraps, trays, cups, films, bottles, caps, and storage containers; 3D printer materials; and battery separator films. The polyolefin-based resin composition of the present invention can also be used in those applications where various post-treatments are performed, for example, applications where sterilization by radiation is performed, such as medical applications and food packaging applications, as well as applications where a low-temperature plasma treatment and the like are performed after molding so as to improve the surface properties such as coating properties. Among these applications, the polyolefin-based resin composition of the present invention is preferably used in automobile components, household articles, and food packaging materials. Moreover, the polyolefin-based resin composition of the present invention may be blended with glass fibers, carbon fibers or the like to produce fiber-reinforced plastics.

The above-described molding is affected by the melt viscosity of the resin, and the molding temperature is preferably in a range of 120 to 250° C., more preferably in a range of 130 to 240° C. When the molding temperature is lower than 120° C., the polyolefin-based resin itself cannot be sufficiently melted, and this may lead to irregularities on the resulting molded article, whereas when the molding temperature is 250° C. or higher, the effects of the present invention may not be attained.

EXAMPLES

The present invention will now be described more concretely by way of Examples and Comparative Examples. It is noted here that, in Examples and Comparative Examples, "part(s)" means "parts by mass".

Examples 1 to 5 and Comparative Examples 1 and 2

To a homopolypropylene (trade name "H700" manufactured by Prime Polymer Co., Ltd., melt flow rate=8 g/10 min (2.16 kg×230° C. according to ISO Standard 1133)) in an amount of 100 parts by mass, 0.05 parts by mass of a phenolic antioxidant (tetrakis[methylene-3-(3',5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate and 0.1 parts by mass of each organic phosphate compound (nucleating agent) shown in Table 2 were added, and these materials were mixed at 1,000 rpm for 1 minute using a Henschel mixer (FM100, manufactured by Mitsui Mining Co., Ltd.) and subsequently kneaded using a biaxial extruder (TEX28V, manufactured by The Japan Steel Works, Ltd.) at an extrusion temperature of 230° C., a screw rotation speed of 150 rpm and a feed rate of 7.5 kg/h, whereby a pellet was produced. For the thus obtained resin composition, the yellowness (Y.I.), the haze, the bending elastic modulus, and the heat resistance in storage at 150° C. were evaluated in accordance with the below-described procedures. The production of nucleating agents and the measurement of P/Na were performed by the following procedures.

<Synthesis of Nucleating Agent 1>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 19 g (0.039 mol) of 2,2'-methylene-bis(4,6-di-t-butylphenyl) phosphate was added to the resultant, which was mixed for 30 minutes, dried under reduced pressure, and then pulverized to obtain a nucleating agent 1 in the form of white powder.

<Synthesis of Nucleating Agent 2>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 14 g (0.350 mol) of sodium hydroxide was added to the resultant, which was mixed for 30 minutes, dried under reduced pressure, and then pulverized to obtain a nucleating agent 2 in the form of white powder.

<Synthesis of Nucleating Agent 3>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 199 g (0.409 mol) of 2,2'-methylene-bis(4,6-di-t-butylphenyl) phosphate was added to the resultant, which was mixed for 30 minutes, dried under reduced pressure, and then pulverized to obtain a nucleating agent 3 in the form of white powder.

<Synthesis of Nucleating Agent 4>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 1 g (0.002 mol) of 2,2'-methylene-bis(4,6-di-t-butylphenyl) phosphate was added to the resultant, which was mixed for 30 minutes, dried under reduced pressure, and then pulverized to obtain a nucleating agent 4 in the form of white powder.

<Synthesis of Nucleating Agent 5>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 37 g (0.076 mol) of 2,2'-methylene-bis(4,6-di-t-butylphenyl) phosphate was added to the resultant, which was mixed for 30 minutes, dried under reduced pressure, and then pulverized to obtain a nucleating agent 5 in the form of white powder.

<Synthesis of Nucleating Agent 6>

To a kneader, 486 g (1.000 mol) of 2,2'-methylene-bis(4,6-di-t-butylphenyl) phosphate, a solution of 40 g (1.000 mol) of sodium hydroxide in 100 g of water, and 97 g of methanol were added, and these materials were kneaded for 1 hour at room temperature. Subsequently, 1.48 g (0.037 mol) of sodium hydroxide was added to the resultant, which was dried under reduced pressure and then pulverized to obtain a nucleating agent 6 in the form of white powder.

<Synthesis of Nucleating Agent 7>

To a kneader, 486 g (1.000 mol) of 2,2'-methylene-bis(4,6-di-t-butylphenyl) phosphate, a solution of 40 g (1 mol) of sodium hydroxide in 100 g of water, and 97 g of methanol were added, and these materials were kneaded for 1 hour at room temperature. Subsequently, 55 g (0.113 mol) of 2,2'-methylene-bis(4,6-di-t-butylphenyl) phosphate was added to the resultant, which was mixed for 30 minutes, dried under reduced pressure, and then pulverized to obtain a nucleating agent 7 in the form of white powder.

<Measurement of P/Na>

The thus obtained nucleating agents were each weighed in an amount of 100 mg, and 10 ml of 61% nitric acid was added thereto, and the resultant was decomposed in a microwave sample decomposition apparatus (TOPwave, manufactured by Analytik Jena A G). The resulting decomposition solution was diluted to 100 ml in a measuring flask and then further diluted 10-fold, after which the diluted solution was filtered through a disposable membrane filter having a pore size of 0.45 μm to prepare a measurement sample solution. Thereafter, P and Na in this measurement sample solution were quantified under the following conditions using an ICP emission spectrophotometer (SPS3500, manufactured by SII NanoTechnology Inc.), and the ratio P/Na in an NA-11 sample was calculated from the thus obtained results.

TABLE 1

| Standard solution | P Phosphorus ICP Standard Solution (Merck Millipore Ltd.) | Na Multielement Standard IV (Merck Millipore Ltd.) |
|---|---|---|
| Chamber gas | absent | absent |
| Purge gas | present | absent |

<Y.I.>

Each pellet obtained above was injection-molded at 200° C. using an injection molding machine (EC100-2A, manufactured by Toshiba Machine Co., Ltd.) to prepare a test piece having dimensions of 60 mm×60 mm×2 mm. Immediately thereafter, the test piece was left to stand in a 23° C. incubator for 48 hours, and the test piece was subsequently taken out and the Y.I. thereof was measured a spectrocolorimeter (COLOR-EYE 7000A, manufactured by X-Rite Inc.). The results thereof are shown together in Table 2.

<Haze>

Each pellet obtained above was injection-molded at an injection temperature of 200° C. and a mold temperature of 50° C. using an injection molding machine (EC100-2A, manufactured by Toshiba Machine Co., Ltd.) to prepare a test piece having dimensions of 60 mm×60 mm×2 mm. Immediately thereafter, the test piece was left to stand in a 23° C. incubator for 48 hours, and the test piece was subsequently taken out and the haze thereof was measured in accordance with ISO-14782. The results thereof are shown together in Table 2.

<Flexural Modulus>

Each pellet obtained above was injection-molded at an injection temperature of 200° C. and a mold temperature of 50° C. using an injection molding machine (EC100-2A, manufactured by Toshiba Machine Co., Ltd.) to prepare a test piece having dimensions of 80 mm×10 mm×4 mm. Immediately thereafter, the test piece was left to stand in a 23° C. incubator for 48 hours, and the test piece was subsequently taken out and the flexural modulus (MPa) thereof was measured in accordance with ISO-178. The results thereof are shown together in Table 2.

<Heat Resistance in Storage at 150° C.>

Each test piece obtained above was placed in a 150° C. gear oven. Thereafter, the test piece was taken out every 24 hours, and the presence or absence of a crack was checked by observation under a microscope and the Y.I. was measured. An evaluation of ○ was given when the endurance time until the crack generation and an increase in Y.I. was 550 hours to 600 hours, while an evaluation of Δ was given when the endurance time was 500 hours to 550 hours. The results thereof are shown together in Table 2.

TABLE 2

|  | Example 1 | Comparative Example 1 | Comparative Example 2 | Example 2 | Example 3 | Example 4 | Example 5 |
|---|---|---|---|---|---|---|---|
| Nucleating agent | 1 | 2 | 3 | 4 | 5 | 6 | 7 |
| P/Na | 1.400 | 1.000 | 1.900 | 1.350 | 1.450 | 1.300 | 1.500 |
| Y.I. of 2-mm test piece | 6.6 | 9.0 | 7.0 | 6.8 | 6.7 | 7.6 | 6.8 |
| Haze, 2 mm (%) | 51.2 | 51.5 | 54.4 | 51.2 | 51.6 | 51.9 | 52.3 |
| Flexural modulus (MPa) | 1,935 | 1,935 | 1,926 | 1,934 | 1,933 | 1,931 | 1,930 |
| Heat resistance in storage at 150° C. | ○ | Δ | Δ | ○ | ○ | ○ | ○ |

From Table 2, it was confirmed that the nucleating agent of the present invention is capable of improving the transparency and the heat resistance of a molded article composed of a polyolefin resin composition. Particularly, it is seen that the Y.I. value was in the 6 range, the haze value was in the 51 rage, and the storage stability at 150° C. was favorable in those cases where the ratio P/Na was 1.350, 1.400 or 1.450.

The invention claimed is:

1. A polyolefin resin composition, comprising a nucleating agent in an amount of 0.001 to 10 parts by mass with respect to 100 parts by mass of a polyolefin resin, the nucleating agent, comprising:

a compound represented by the following Formula (1):

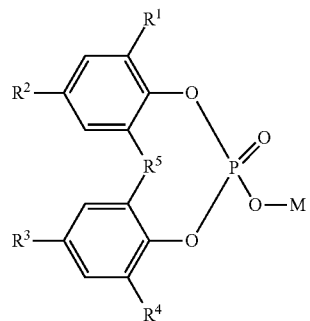

(1)

wherein in Formula (1), $R^1$ to $R^4$ each independently represent a hydrogen atom or a linear or branched alkyl group having 1 to 9 carbon atoms; $R^5$ represents an alkanediyl group having 1 to 4 carbon atoms; and M represents a sodium atom, and a compound represented by the following Formula (1'):

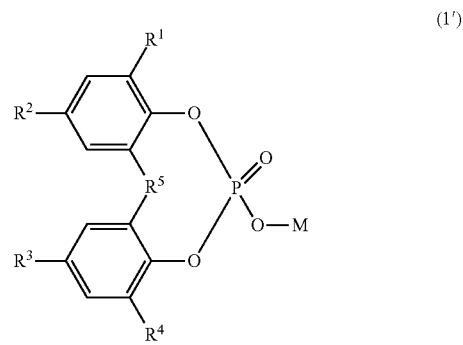

(1')

wherein in Formula (1'), $R^1$ to $R^4$ each independently represent a hydrogen atom or a linear or branched alkyl group having 1 to 9 carbon atoms; $R^5$ represents an alkanediyl group having 1 to 4 carbon atoms; and M represents a hydrogen atom, wherein a mass ratio of phosphorus atoms and sodium atoms in the nucleating agent, P/Na, is in a range of 1.350 to 1.500.

2. The polyolefin resin composition according to claim 1, wherein the mass ratio of phosphorus atoms and sodium atoms in the nucleating agent, P/Na, is in a range of 1.350 to 1.450.

3. The polyolefin resin composition according to claim 1, wherein the polyolefin resin is at least one selected from the group consisting of a polypropylene and an ethylene-propylene block or random copolymer.

4. A molded article obtained by molding the polyolefin resin composition according to claim 1.

* * * * *